Patented Jan. 19, 1932

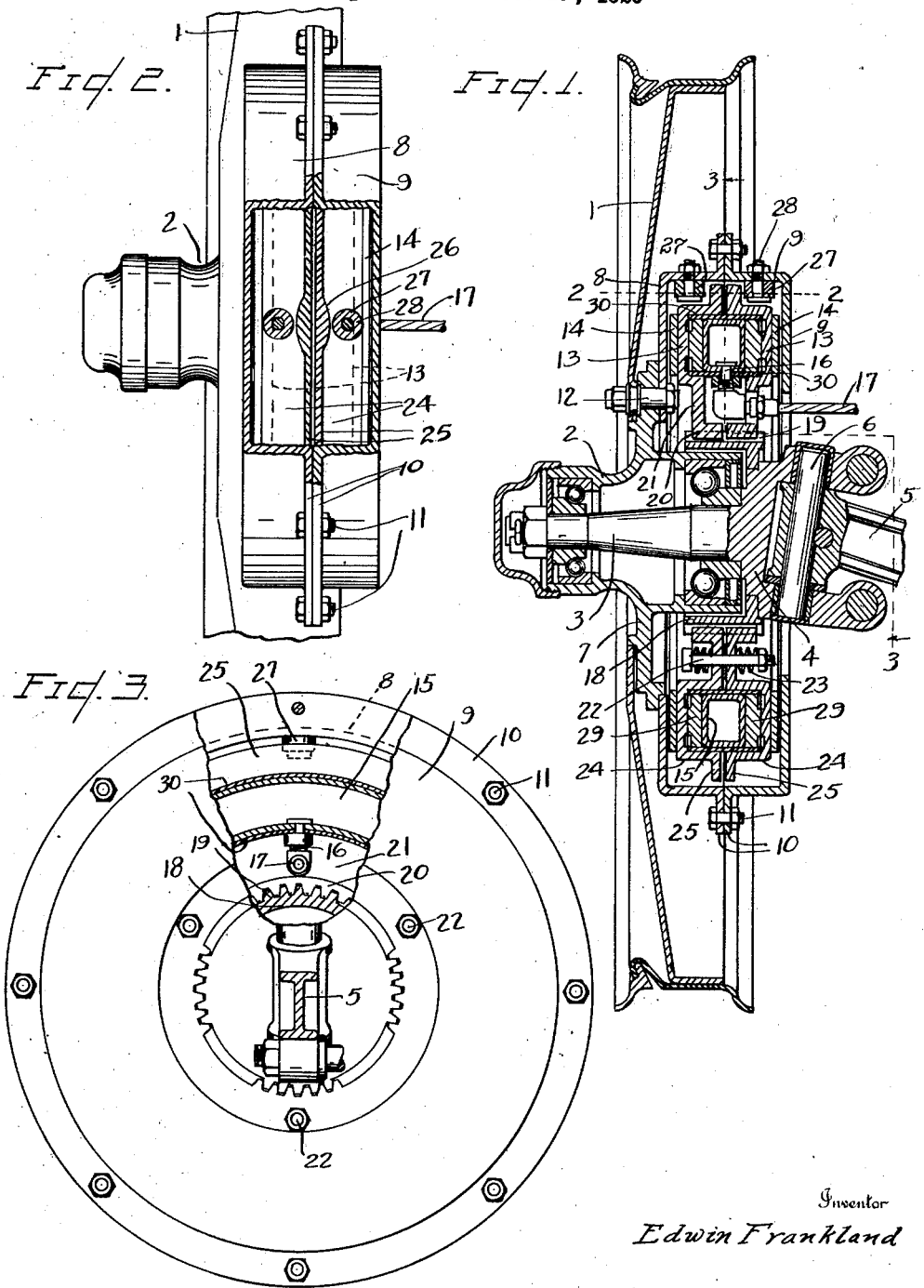

1,842,259

UNITED STATES PATENT OFFICE

EDWIN FRANKLAND, OF DETROIT, MICHIGAN, ASSIGNOR TO BENDIX BRAKE COMPANY, OF SOUTH BEND, INDIANA, A CORPORATION OF ILLINOIS

FLUID PRESSURE BRAKE FOR MOTOR VEHICLES

Application filed December 19, 1923, Serial No. 681,502. Renewed September 4, 1929.

This invention relates to vehicle brakes and particularly relates to motor vehicle brakes operable by fluid pressure.

The more essential objects of the invention are to largely increase the effective frictional contact area, as compared to present practice, and to consequently permit of a decreased pressure per unit of such area; to effect an intermittent relief of the braking pressure, thus preventing locking of the wheels, and reducing heating effect; to insure a perfect equalization of the several brakes of a vehicle under all load conditions; to minimize the necessary physical effort in effecting an application of brakes; and to provide a brake construction applicable, without material change of design, to both front and rear wheels.

In attaining these objects, the invention contemplates locating within the brake drum of a vehicle wheel an annular expansible fluid receiver arranged between annular sliding brake shoes engageable through expansion of said receiver with disk portions of said drum, said shoes being suitably restrained from rotation, and being formed with cam (or equivalent) projections, which, as the wheel rotates, are engageable, during an application of the brake, with one or more rollers (or equivalent members) upon the drum, so as to intermittently shift the shoes to a predetermined extent toward each other, thus relieving the braking stress.

A preferred embodiment of the invention is illustrated in the accompanying drawings, wherein, Fig. 1 is an axial vertical sectional view of a wheel equipped with the improved brake mechanism.

Fig. 2 is a plan view of the same with a portion of the brake drum broken away substantially on line 2—2 of Fig. 1 to show the cam and roller means for intermittently relieving the braking stress.

Fig. 3 is a view of the side of the brake drum adjacent the axle, said view being partly in section on line 3—3 of Fig. 1.

In these views the reference character 1 designates a vehicle wheel, 2 the hub thereof, 3 a spindle journaling said hub, 4 a knuckle bearing integral with said spindle, and 5 an axle upon which the bearing 4 is swiveled for steering purposes, by a king-pin 6. There is rigidly secured to the wheel, and preferably to an annular flange 7 of the hub, a two-part brake drum, the parts 8 and 9 of which are formed with exterior annular flanges 10 abutting in the central rotational plane of the drum and rigidly connected by bolts 11. The two parts of said drum are formed with spaced annular disk portions, one of which is secured by bolts 12 to the flange 7. Within said drum, two annular disk-shaped brake shoes 13 are arranged, and are provided with suitable linings 14, also annular, to engage the disk portions of the drum when said shoes are spread apart. To effect such a spreading, a hollow expansible annular fluid receiving tube 15 is arranged between the shoes 13, and is provided with a nipple 16 projecting toward the axis of the wheel and connected with a flexible pipe 17 through which a suitable fluid, either air or liquid, may be introduced into said receiver, under pressure, or may discharge therefrom. The two brake shoes 13 are restrained from rotation, while permitted to slide to and from each other, by a collar 18 rigidly mounted upon the knuckle bearing 4, and surrounding the inner portion of the hub 2, said collar being formed with circumferentially spaced sets of teeth 19, extending parallel to its axis and engaging corresponding teeth 20 formed integral upon the inner periphery of webs 21 extended radially of the shoes 13. At suitable circumferential intervals, bolts 22 are passed freely through the webs 21, and springs 23 coiled upon the end portions of said bolts urge said webs and the shoes 13 toward each other, holding them normally out of contact with the disk portions of the drum 8—9. The shoes 13 are formed with inner annular channels 24 opposed to each other at the outer margins of said shoes, said channels 24 jointly embracing the fluid receiver 15. Radially projecting flanges 25 are adjacently formed upon the peripheries of the shoes 13, and at suitable intervals cam enlargements 26 are formed upon the outer faces of said flanges. Said enlargements co-act with one or more pairs of rollers 27 journaled upon bolts 28 projecting radially inward from the drum 8—9. When the brake is applied, said rollers periodically encounter the cam enlargements, momentarily shifting the brake shoes toward each other and slightly away from the disks of the drum. Thus there is effected a periodic relief of the braking stress, and a locking effect of the brakes upon the wheels is avoided. Upon release of the brakes, the springs 23 shift the brake shoes clear of the disk faces of the drum, and the cam projections 26 do not then engage the rollers 27.

From the foregoing description, the operation of the invention is believed apparent. When a braking fluid pressure is established within the expansible member 15, the lateral expansion of said member acts equally throughout the entire circumferential extent of said member upon the shoes 13 to urge the same apart and into engagement with the disk surfaces of the drum. Preferably annular pressure plates 29 are arranged between the tube 15 and the brake shoes, said plates being free to slide laterally between inner and outer retainer rings 30, between which the tube 15 is embraced. Said rings prevent any wasted expansion of said tube in a radial direction. The control means for the flow of fluid through the pipe 17 to and from the receiver 15 is no feature of the present invention and is not disclosed. Flexibility of said pipe permits the wheel 1 to be swiveled for steering purposes about the king-pin 6, without any effect upon the braking control. For the rear wheels of a vehicle, there may be used substantially the same brake mechanism as is herein described but flexibility of the pipe 17 is not a requisite.

It is to be noted that the described fluid pressure actuating means is adapted to equalize the braking pressure acting through the two shoes 13, and also to effect an equal distribution of the pressure throughout the entire area of the frictionally engaged faces. It is to be further noted that the construction, because of its balanced application of pressure in opposite directions avoids any undesirable axial thrust upon the wheel, either inwardly or outwardly.

What I claim is:

1. In a vehicle brake, a vehicle wheel, a pair of co-acting disk brake members, one of which is rotatable with said wheel and the other relatively stationary, one of said members being slidable axially of the wheel to engage and disengage the other, and automatic means effecting an intermittent release of said brake members when engaged.

2. In a vehicle brake, a vehicle wheel, a disk brake member secured to said wheel to rotate therewith, a brake shoe slidable axially of the wheel into and out of engagement with said disk member, means restraining said brake shoe from rotation with the wheel, means for yieldably pressing said brake shoe against said disk member, and elements upon said disk member and shoe engageable through rotation of the wheel in the disk-engaging position of the shoe, to intermittently relieve pressure of said shoe on the disk.

3. In a vehicle brake, a brake drum having spaced disk walls, a pair of annular brake shoes within said drum for engagement with said walls, means between said shoes for shifting the same against said walls, flanges projecting outwardly from said shoes having cam projections upon their remote lateral faces, and rollers mounted upon a peripheral wall of said drum, engageable by said cam projections when the drum is rotated and is engaged by the brake shoes, to periodically relieve the braking pressure.

4. In a vehicle brake, the combination with a vehicle wheel, of spaced disk brake members secured to said wheel to rotate therewith, a coacting pair of annular brake shoes between said disks, having their outer portions spaced to form an annular chamber and to adapt said portions for braking coaction with said disks, an expansible receiver for a fluid under pressure arranged within said annular chamber, means restraining said brake shoes from rotation, means for delivering a fluid under pressure to said receiver, and means engaging the inner portions of said shoes normally holding the same disengaged from said disks.

5. Brake mechanism comprising a rotatable brake disk member, a non-rotatable brake disk member, said members being normally disengaged, means operable to move one of said members into braking engagement with the other, cam surfaces arranged on opposite sides of the disk members and oppositely disposed with respect to each other and means co-operating therewith during the rotation of the rotatable disk member to intermittently interrupt the braking engagement of said members.

6. Brake mechanism comprising a rotatable brake disk member, a non-rotatable brake disk member, means operable to move one of said members axially into braking engagement with the other, and means operable automatically during the rotation of the rotatable disk member to intermittently interrupt the braking engagement of said members.

7. Brake mechanism comprising a rotatable brake disk, a non-rotatable brake disk, said discs being normally disengaged, means operable to move the non-rotatable brake disk into braking engagement with the rotatable disk, a cam on one face of the non-rotatable disk and means co-operating therewith to automatically effect an intermittent release of said braking engagement.

8. Brake mechanism comprising a pair of spaced apart rotatable brake disks, a pair of spaced apart non-rotatable brake disks adapted to be moved into braking engagement with the rotatable disks, applying means to move said disks into braking engagement, cam surfaces arranged on opposite faces of the non-rotatable disks and means co-operating therewith to automaticaly intermittently effect a release of such braking engagement.

9. Brake mechanism comprising a pair of spaced apart rotatable brake disks, a pair of spaced apart non-rotatable brake disks adapted to be moved into braking engagement with the rotatable disks, applying means to move said disks into braking engagement, releasing means independent of the applying means adapted to automatically intermittently effect a release of such braking engagement.

10. Brake mechanism comprising a pair of spaced apart rotatable brake disks, a pair of spaced apart non-rotatable brake disks adapted to be moved into braking engagement with the rotatable disks, applying means to move said disks into braking engagement, releasing means independent of the action of the applying means adapted to automatically intermittently effect a release of such braking engagement during the application of the applying means.

11. Brake mechanism comprising a rotatable brake disk member, a non-rotatable brake disk member, said members being normally disengaged, an expansible member to move one of said members into braking engagement with the other, and means operable automatically during the rotation of the rotatable disk member to intermittently depress the expansible member to interrupt the braking engagement of said members at a rate varying directly with the rate of rotation of the rotatable disk.

12. Brake mechanism comprising a rotatable brake disk member, a non-rotatable brake disk member, said members being normally disengaged, means operable to move one of said members into braking engagement with the other, a cam on one face of the non-rotatable disk, and a member carried by the rotatable disk adapted to engage said cam to automatically interrupt the braking engagement of said disks.

13. Brake mechanism comprising a rotatable brake disk member, a non-rotatable brake disk member, said members being normally disengaged, expanding means operable to urge one member into braking engagement with the other, and means operable to automatically intermittently overcome said expanding means and interrupt said braking engagement.

14. Brake mechanism comprising a rotatable brake member, a non-rotatable brake member, said members being normally disengaged, an expansible means to move one of said members into braking engagement with the others, and means operable to intermittently effect the expansible means.

15. Brake mechanism for a rotatable wheel for a pair of spaced apart brake disks, a non-rotatable torque-taking member arranged axially thereof, a pair of brake disks non-rotatably supported upon said torque-taking member to be spread apart into braking engagement with the rotatable disks, an expansible fluid pressure cell disposed between said non-rotatable disks spaced radially from and independent of the torque-taking member and adapted to be expanded to effect braking engagement of said disks, and means for intermittently depressing said cell.

16. Brake mechanism for a rotatable wheel having a pair of brake disks spaced axially apart providing an annular chamber therebetween, a pair of brake disks arranged non-rotatably within said chamber adapted to be spread apart axially into braking engagement with the rotatable disks, said non-rotatable disks having normally abutting peripheral flange portions and normally abutitng axial flange portions and opposed channel portions arranged radially between said two flange portions, and a fluid pressure cell disposed within said channel portions expansible to urge said disks apart into braking engagement with the rotatable disks.

17. Brake mechanism for a rotatable wheel having a pair of brake disks spaced axially apart providing an annular chamber therebetween, a pair of brake disks arranged non-rotatably within said chamber adapted to be spread apart axially into braking engagement with the rotatable disks, said non-rotatable disks having normally abutting peripheral flange portions and normally abutting axial flange portions and opposed channel portions arranged radially between said two flange portions, means extending through the axial flange portions adapted to exert a tension thereon tending to hold said disks toward each other, and a fluid pressure cell disposed within said channel portions expansible to urge said disks apart counter the tension of said means into braking engagement with the rotatable disks.

18. Brake mechanism for a rotatable wheel having a pair of brake disks spaced axially apart providing an annular chamber therebetween, a pair of brake disks arranged non-rotatably within said chamber adapted to be spread apart axially into braking engagement with the rotatable disks, said non-rotatable disks having normally abutting peripheral flange portions and normally abutting axial flange portions and opposed channel portions arranged radially between said two flange portions, means extending through the axial flange portions adapted to exert a tension thereon tending to hold said disks toward each other, a fluid pressure cell disposed within said channel portions expansible to urge said disks apart counter the tension of some means into braking engagement with the rotatable disks and means carried by the rotatable brake disks adapted during the rotation of the brake disks to engage at intervals the peripheral flange portions of the nonrotatable disks to urge said disks away from the rotatable disks and out of frictional engagement therewith.

In testimony whereof I sign this specification.

EDWIN FRANKLAND.